Dec. 23, 1930. H. T. HEIMBERGER ET AL 1,786,065
HOLDER FOR HEATED DEVICES
Filed Nov. 30, 1927
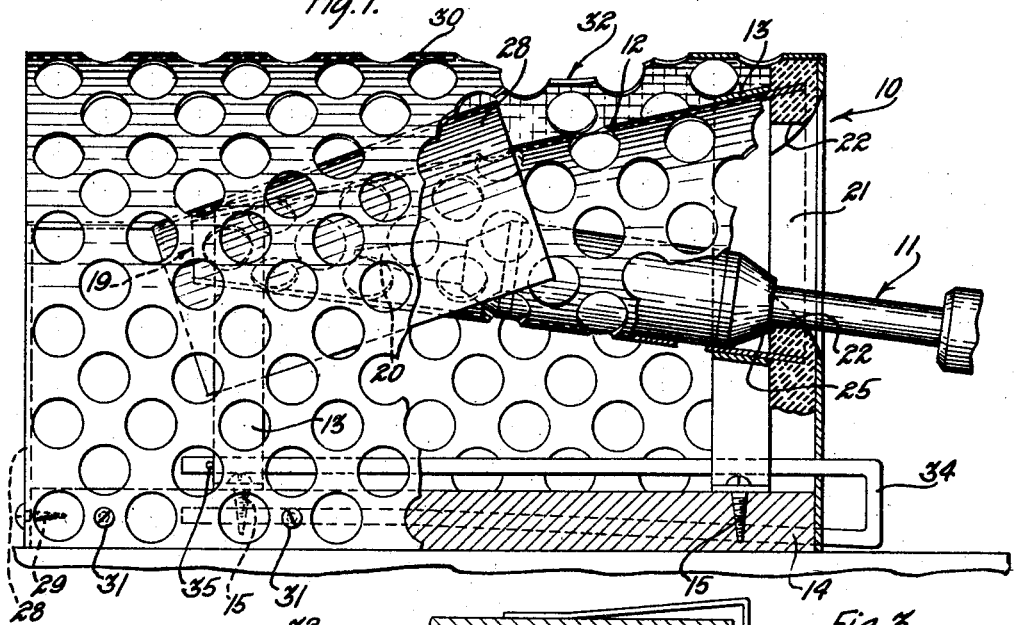
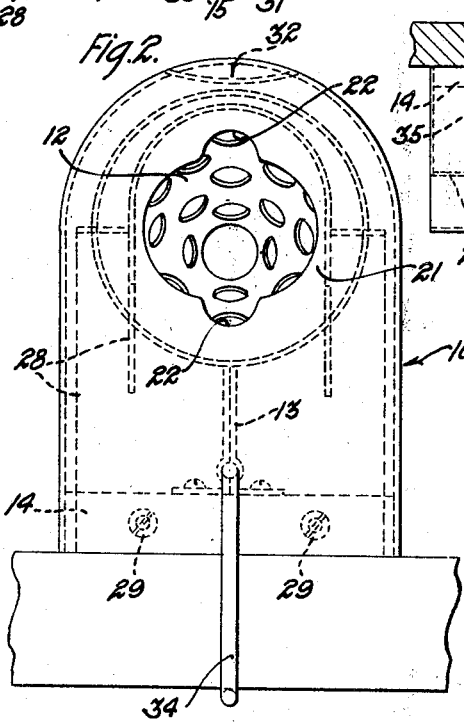
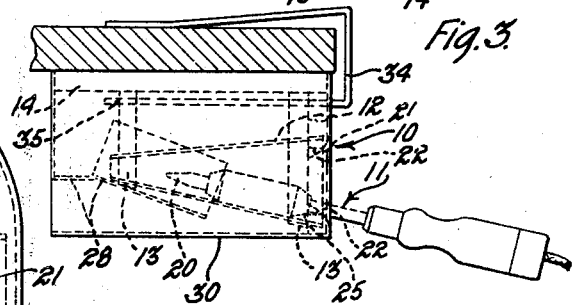
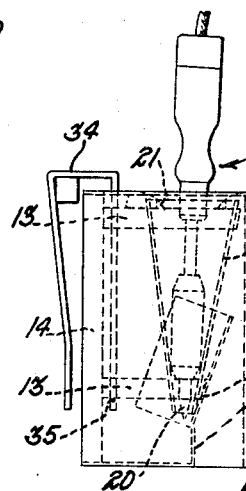
Inventors
Harry T. Heimberger
Emerson Pugh Patented Dec. 23, 1930

1,786,065

UNITED STATES PATENT OFFICE

HARRY TOBIAS HEIMBERGER, OF RIVERSIDE, AND EMERSON PUGH, OF CHICAGO, ILLINOIS, ASSIGNORS TO WESTERN ELECTRIC COMPANY, INCORPORATED, OF NEW YORK, N. Y., A CORPORATION OF NEW YORK

HOLDER FOR HEATED DEVICES

Application filed November 30, 1927. Serial No. 236,627.

This invention relates to a holder for heated devices, and more particularly to a holder especially adapted for soldering irons.

In the use of heated tools, such as electrically heated soldering irons, it is common practice to insert the hot iron in a holder when not in actual use to prevent accidental contact with the heated iron by an operator. However, sometimes the tool is dislodged inadvertently from the holder. Should this occur injuries may be sustained by the operator who must necessarily work in close proximity to the holder. Also, the operator may be injured by accidently coming in contact with the holder which, as previously provided, is at a temperature sufficiently high to cause severe burns or by hot solder dripping from the tip of the soldering iron and running out of the holder when the tool is moved to the vicinity of the parts being soldered.

The primary object of this invention is to provide a simple and durable holder for a heated device arranged to prevent injury to an operator through accidental dislodgment of the heated device or accidental contact with the holder.

One embodiment of the invention consists of a holder for a soldering iron, wherein the iron is supported by a conical shaped member open at the tip and covered at the other end by a face plate which has means for preventing accidental withdrawal of the iron from the holder by requiring that the iron must be moved to a predetermined position before it can be removed therefrom. An imperforate baffle serves to deflect the heated air from the tip of the conical support towards an enlarged opening in a perforated exterior guard which encloses the conical shaped member. The base on which the holder is mounted is provided with a clamping means adaptable to a variety of different types of supports for maintaining the holder in various positions.

Other objects of the invention will appear more clearly from the following detailed description when taken in connection with the accompanying drawing illustrating a preferred embodiment of the invention, in which Fig. 1 is a side elevational view, partly in section, of a holder constructed in accordance with the invention;

Fig. 2 is a front end view showing the holder resting on a bench;

Fig. 3 is a side view disclosing the holder supported under a bench, and

Fig. 4 is a side view showing the holder suspended on end from a bar.

Referring now to the drawing wherein like numerals have been employed to designate similar parts throughout the various views, the numeral 10 designates generally a soldering iron holder disclosed as one embodiment of the invention. A soldering iron 11 is adapted to be supported in a conical shaped perforated member 12 which is held in position by steel bands 13 surrounding the conical member at each end and fastened to a heat resisting base 14 by screws 15.

The small end 19 of the conical member 12 is provided with an end opening of just sufficient size to permit the soldering tip 20 of the iron 11 to project therethrough as shown in Fig. 4. The large open end of the conical supporting member 12 is associated with a casting 21 having a circular central opening for admitting the soldering iron, which is provided with diametrically opposed semi-circular slots 22 for preventing accidental dislodgment of the iron 11 from the holder 10. A shoulder 25 of the iron 11 engages the inner face of the circular slot 22 and the iron can be removed from the holder only by moving the iron to clear the slot. An imperforate sheet metal baffle 28 situated above and partially surrounding the back half of the conical shaped member 12 extends over the rear edge of the base 14 where it is secured by screws 29 and serves to deflect heat from the soldering iron through an opening 32 in a perforated guard 30. The perforated guard 30 substantially surrounds the members described and is fastened to the sides of the base 14 by screws 31. The enlarged opening 32 of the perforated guard is positioned above and at the forward end of the baffle 28 which is adapted to guide the hot air through an opening without striking the guard 30. A clamp 34 passing over the upper surface of the base 14 and through apertures formed by co-operating bent portions in the steel bands 13 is held in position by a cotter pin 35. This clamp is used for supporting the holder 10 in various positions as disclosed in Figs. 3 and 4.

In the use of the holder in a horizontal position, either upon or under a bench, the operator is protected against injury due to accidental dislodgment of the hot soldering iron by the retaining slots 22 in the face casting 21. The perforated guard 30 serves to protect the operator from coming in contact with a surface in the holder that is hot enough to cause a burn. The invention is especially valuable in soldering terminals to telephone equipment mounted on high steel frames where one operator is working above another. The holder is so designed that it can be suspended by means of a clamp which may engage a cross-bar or other support in various positions as illustrated in Figs. 3 and 4 and is so guarded that molten solder which may drip from the hot soldering tip will not fall upon and burn an operator working under it. From the foregoing it will be understood that the invention provides a very effective means for expeditiously holding a heated tool when not in use.

Although the invention as herein described and illustrated is particularly well adapted for use in connection with a soldering iron, it should be understood that the invention is adaptable to other types of heated tools and should be limited only by the scope of the appended claims.

What is claimed is:

1. In a holder for heated devices, a supporting means, means for preventing accidental displacement of the heated device from the supporting means, a guard having an enlarged opening in its periphery, and means for deflecting heated air from said heated device away from the major portion of the guard and toward the opening in the guard.

2. In a holder for heated devices, a guard having an enlarged opening in its periphery, and means for deflecting heated air from said heated device away from the major portion of the guard toward the opening in the guard.

3. In a holder for heated devices, a support for the heated device, and a face plate for the support having a circular central opening and slots therein for preventing accidental dislodgment of the heated device from the support.

4. In a holder for heated devices, a conical shaped perforated member for supporting the heated device, means for preventing dislodgment of the heated device, and a perforated guard for preventing contact with the conical member.

5. In a holder for heated devices, a support for the heated device, a face plate for the support having a circular central opening and slots therein for preventing dislodgment of the heated device from the support, and means for supporting the holder in various positions.

6. In a holder for heated devices, a conical shaped perforated member for supporting the heated device, means for preventing dislodgment of the heated device, a perforated guard having an enlarged opening, means for deflecting the heated air toward the opening in the guard, and means for supporting the holder in various positions.

7. In a holder for heated devices, a conical shaped perforated member open at both ends, a face plate having slots for preventing dislodgment of the heated device from within the conical member, a guard having an enlarged opening surrounding the conical shaped member, and means for deflecting heated air from the tip of the conical shaped member toward the enlarged opening in the guard.

8. In a holder for a soldering iron, a heat insulated base, a conical shaped perforated member open at both ends for supporting the iron, a face plate having a circular central opening and diametrically opposite slots therein for preventing accidental dislodgment of the iron from the conical shaped member, a perforated guard having an enlarged opening surrounding the conical shaped member, means at the tip of the conical shaped member for deflecting heated air therefrom to the enlarged opening in the guard, and means for supporting the holder in various positions.

9. In a holder for heated devices, a guard having an enlarged opening in its periphery, and angularly disposed U-shaped deflecting means for directing the heated air from the heated device through the opening in the periphery of the guard.

10. In a holder for heated devices, an outer perforated guard member, an inner perforated support member, and means interposed between the inner support member and the outer guard member for deflecting heated air from contact with the guard member.

11. In a holder for heated devices, an outer perforated guard member having an enlarged opening in its periphery, an inner perforated support member, and means interposed between the inner support member and the outer guard member for deflecting heated air from the heated device toward the enlarged opening in the outer guard member.

In witness whereof, we hereunto subscribe our names this 19th day of November, A. D. 1927.

HARRY TOBIAS HEIMBERGER.
EMERSON PUGH.